United States Patent
Rawson

[11] 3,829,195
[45] Aug. 13, 1974

[54] OPTICAL COUPLERS
[75] Inventor: Eric Gordon Rawson, Stirling, N.J.
[73] Assignee: Bell Telephone Laboratories, Incorporated, Murray Hill, N.J.
[22] Filed: June 25, 1973
[21] Appl. No.: 373,272

[52] U.S. Cl. ... 350/96 R, 350/96 WG, 350/175 GN
[51] Int. Cl. .............................................. G02b 5/14
[58] Field of Search ...... 350/96 R, 96 WG, 175 GN

[56] References Cited
UNITED STATES PATENTS
3,466,111   9/1969   Ring ........................................ 350/54
3,508,807   4/1970   Mayer ................................. 350/96 R

*Primary Examiner*—David H. Rubin
*Attorney, Agent, or Firm*—L. C. Canepa

[57] ABSTRACT

An optical coupler comprises at least two movable graded index-of-refraction cylindrical segments. At least two of the segments have unequal lengths and are longitudinally butted together to form a structure having flat input and output faces. The overall length of the segments approximates a half wavelength of the period of the sinusoidal path followed by a light beam in longitudinally propagating through the segments. A relatively large lateral movement of the segments, while maintaining the butting relationship, causes the image of a light spot directed at the input face of the coupler to move a relatively small distance over the output face thereof. The structure is suited, for example, to achieve a precise high-efficiency coupling between optical fiber ends to be spliced together. More generally, the coupling structure functions as a microdisplacement optical probe or optical beam redirector.

7 Claims, 5 Drawing Figures

OPTICAL COUPLERS

BACKGROUND OF THE INVENTION

This invention relates to optical couplers and more particularly to couplers in which the relative position between an input light beam and a focused output image thereof can be selectively controlled in a precise manner.

In a variety of optical signal processing applications of practical importance, it is necessary to couple an input optical beam to a specified output location with precise registration. One such particular application of practical interest involves the splicing together of optical fiber ends. The light emanating from one fiber end must be directed at the other end in an accurate manner to achieve a high-efficiency light coupling therebetween. But the handling and aligning of very-small-diameter fibers to achieve this desired result involve vexing problems. To solve these problems active work is under way to devise improved splicing techniques. These techniques include, for example, various modifications of the simple expedient of merely butting the fiber ends together or utilizing a third element between the ends to enhance the coupling therebetween.

SUMMARY OF THE INVENTION

An object of the present invention is to provide adjustable optical couplers.

More specifically, an object of this invention is an adjustable optical coupler adapted to be interposed between optical fiber ends that are to be joined together.

Briefly, these and other objects of the present invention are realized in a specific illustrative embodiment thereof that comprises two graded-index cylindrical segments having different lengths. The segments are longitudinally butted together to form a structure whose overall length is a half wavelength of the period of the sinusoidal path followed by a light beam in longitudinally propagating through the segments. If the two segments are laterally displaced with respect to each other, an input beam oriented perpendicular to the input face will emerge from the output face slightly canted. The position of the beam on the output face is determined by the relative displacement between the segments. The relationship between segment displacement and the amount of the corresponding beam movement on the output face of the structure is a function of the difference in length of the two segments. As a practical matter movement step-down ratios of, for example, 10 to 20 are achievable. Thus, very sensitive movement and precise positioning of the output beam are possible.

A second specific illustrative embodiment of the invention includes a movable graded-index segment sandwiched between two stationary graded-index segments. The overall length of this three-segment structure is a half wavelength as defined above. Relatively large displacements of the movable segment result in relatively small displacements of a beam emerging from the output face of the coupler. As the width of the movable segment is decreased, the displacement step-down ratio is increased. In this embodiment, the beam emerges from the output face of the coupler perpendicular or approximately perpendicular thereto.

BRIEF DESCRIPTION OF THE DRAWING

A complete understanding of the present invention and of the above and other objects thereof may be gained from a consideration of the following detailed description presented hereinbelow in connection with the accompanying drawing in which.

DETAILED DESCRIPTION

The cylindrical segments to be described hereinbelow comprise pieces of optical fibers or rods of the type disclosed by A. D. Pearson, W. G. French and E. G. Rawson in *Applied Physics Letters*, 15, page 76 (1969). More specifically, a typical such fiber with a circular cross-section exhibits an index of refraction $n$ that decreases with the distance $r$ from its center according to the relationship $$n = n_o (1 - 2r^2/b^2)$$

where $n_o$ is the index of refraction at the center of the fiber, and $b$ is a parameter of the graded-index material of the fiber.

It can be shown that a piece (a cylindrical segment) of such a graded-index fiber acts as a thick lens with a focal length that is determined by the parameter $b$ and the length of the piece.

An optical beam longitudinally propagating through a graded-index fiber follows a nearly sinusoidal path. As they advance through the fiber, the rays representative of the beam focus at a point (as if they had passed through a conventional lens) and alternatively and repeatedly converge and diverge.

Figure 1:
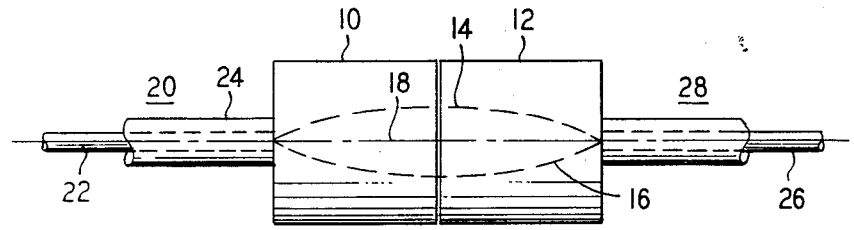
FIGS. 1 and 2, included for purposes of explanation, depict an optical coupler comprising two equal-length graded-index cylindrical segments.

For explanatory and background purposes, two equal-length graded-index cylindrical segments 10 and 12 are shown in FIG. 1. The segments are butted together and their overall length is assumed to be a half wavelength of the periodic length of the sinusoidal path followed by a propagating beam in transit through the segments. This half-wavelength path is represented in FIG. 1 by dashed-line rays 14 and 16. The optic axes of the segments 10 and 12 of FIG. 1 are assumed to be colinear and are represented by a dot-dash line 18.

In FIG. 1 an optical beam is directed at the lefthand or entry face of the segment 10 by a conventional optical fiber 20 that includes a cylindrical core 22 surrounded by a cladding 24. The core 22 may be of the type that exhibits either a graded or a constant index of refraction measured along the radius thereof. In either case, for a so-called single-mode fiber, the diameter of the core 22 is relatively small, for example 4 micrometers ($\mu$m). The outer diameter of a typical such cladded core fiber is about 200 $\mu$m.

Although as a practical matter it is difficult, especially under field conditions, to exactly center the core 22 with respect to the optic axis 18 of the segment 10 of FIG. 1, such an ideal relative position is depicted in FIG. 1. Furthermore, the core 26 of a cladded-core output fiber 28 is also shown as being exactly centered with respect to the optic axis 18. In this ideal assumed case, an input spot directed at the lefthand face of the two-segment structure is imaged on the righthand face as a spot centered exactly about the point defining the intersection of the optic axis 18 with the righthand face. As a result a substantial portion of the optical power directed at the segment 10 via the fiber 20 is coupled to the core 26 of the output fiber 28.

Figure 2:
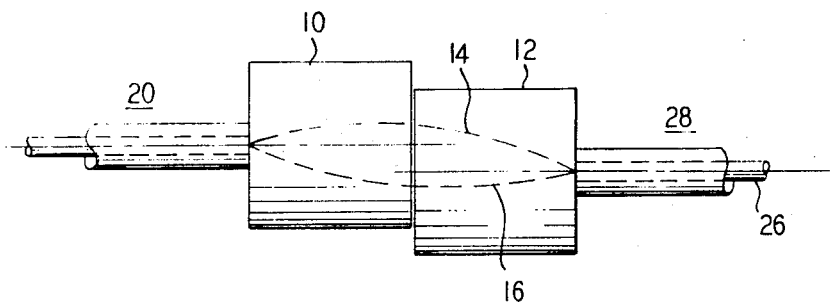

In FIG. 2, which is also included for explanatory and background purposes, the butted-together segments 10 and 12 are represented as being laterally displaced relative to the aligned position of FIG. 1. As a result of this displacement, the ray paths 14 and 16 in the segment 12 are not symmetrically disposed with respect to the optic axis of the segment 12. But despite the indicated displacement, the optical image formed on the righthand face of the segment 12 is still centered relative to the optic axis thereof. Hence, no displacement of the image spot occurs with respect to the core 26 of the output fiber 28.

In practice the ideal positioning represented in FIGS. 1 and 2 between the fibers 20 and 28 and the segments 10 and 12 is, of course, exceedingly difficult to achieve. If the relative positions of the depicted elements are as shown in FIGS. 1 and 2 except that, for example, the output fiber 28 is not exactly centered with respect to the optic axis of the segment 12, it is apparent that less-than-optimal coupling between the fibers 20 and 28 will be realized. And, as pointed out above in connection with the description of FIG. 2, no lateral displacement of the segments 10 and 12 is effective to remedy such a misalignment.

Figure 3:
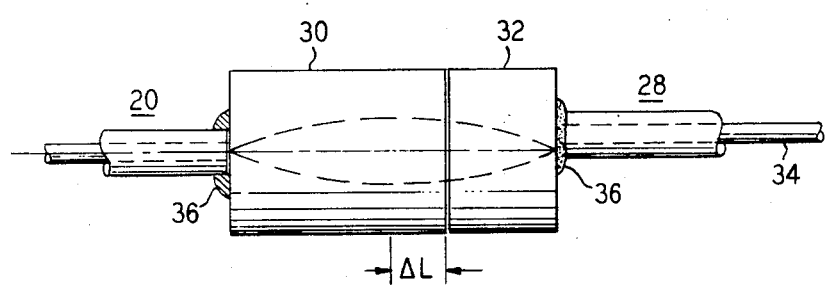
FIGS. 3 and 4 show a specific illustrative two-segment optical coupler made in accordance with the principles of the present invention.

In accordance with one aspect of the principles of the present invention, lateral displacement of two butting graded-index segments does result in movement of an image spot relative to a fixed point on the output face of a two-segment optical coupler. FIG. 3 shows an illustrative coupler of this type.

The structure shown in FIG. 3 includes two butted-together graded-index segments 30 and 32. For illustrative purposes as well as for the purpose of a direct comparison with FIGS. 1 and 2, the segments are shown in FIG. 3 utilized as a coupler between input and output optical fibers 20 and 28, respectively. The overall length of the segments 30 and 32 is a half wavelength of the periodic length of the sinusoidal path followed by a propagating beam in transit through the segments. But importantly, in accordance with the principles of the present invention, the two segments are not equal in length. This structural feature constitutes the main difference between the FIG. 3 embodiment and the previously described structure represented in FIGS. 1 and 2. The practical significance of this difference will become apparent below.

In FIG. 3 the segments 30 and 32 are shown exactly aligned with their optic axes (dot-dash lines) colinear. In that particular case the coupling action of the FIG. 3 arrangement is essentially the same as that of the FIG. 1 structure. An input spot centered about the optic axis of the segment 30 is imaged on the righthand face of the segment 32 centered about its optic axis, as shown in FIG. 3.

In the specific embodiment of FIG. 3, the segment 30 is longer than the segment 32. In particular, the segment 30 is represented as being longer by a quantity $\Delta L$ than one of the equal-length quarter-wavelength sections 10 and 12 shown in FIGS. 1 and 2.

Illustratively, the fibers 20 and 28 of FIG. 3 are respectively attached to the opposed faces of the two-segment coupler by a suitable index-matching adhesive 36 such as HE-79 optical cement made by the Eastman Kodak Company, Rochester, N.Y. Such a material mechanically secures the fibers in place with respect to the segments 30 and 32 and at the same time minimizes reflections at the interfaces between the fibers and the attached segments.

To illustrate the capabilities of the FIG. 3 coupler, it is assumed that the input fiber 20 is attached to the segment 30 centered about the optic axis thereof but that the output fiber 28 has been attached slightly off-center with respect to the optic axis of the segment 32. In that case it is apparent from the ray representations of FIG. 3 that the power in the focused output beam is not optimally coupled to the core 34 of the output fiber 28.

In accordance with the principles of the present invention the off-center orientation between the focused output spot and the core 34 of FIG. 3 may be compensated for. This is accomplished by moving the segments 30 and 32 with respect to each other while maintaining a butting relationship therebetween. Relative movement of the segments may include an $x$ direction component (parallel to a vertical axis in the plane of the drawing) and/or a $y$ direction component (parallel to an axis perpendicular to the plane of the drawing).

Illustratively, the segments 30 and 32 of FIG. 3 contain therebetween an index-matching material which minimizes reflections at the interface between the segments. Advantageously, this material serves as an adhesive that is hardenable after adjustment of the segments to secure them permanently in place. A typical such material is the aforementioned HE-79 optical cement.

Figure 4:
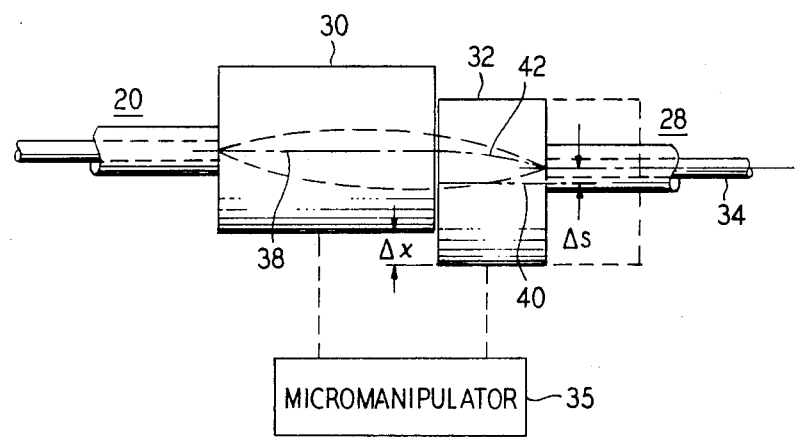

As indicated in FIG. 4, assume that the segment 32 is moved downward relative to the segment 30 by an amount $\Delta x$. This is done, for example, by means of a conventional micromanipulator 35 temporarily attached to the segments 30 and 32. The result of the indicated displacement can be determined, for example, by considering a ray that propagates through the segment 30 along the optic axis 38 thereof. This ray is oriented perpendicular to the planar interface between the segments 30 and 32. It is known that this perpendicular ray would come to a focus on the optic axis 40 of the segment 32 a quarter wavelength away from the interface. But in the assumed embodiment the segment 32 is less than a quarter wavelength long. (The dashed outline to the right of the segment 32 indicates how much longer the segment would have to be to constitute a quarter-wavelength section.) Hence, although the perpendicular ray bends toward the axis 40 in traversing the segment 32 (see ray 42), the ray 42 does not reach the axis 40 in the course of longitudinally propagating through the relatively short section 32.

In the particular embodiment depicted in FIG. 4, the point at which the ray 42 intersects the righthand face of the segment 32 is located slightly above the optic axis 40. The distance of this point from the axis 40 is designated $\Delta s$. Significantly, this image point can be adjusted to be coincident with the center of the core 34 of the output fiber 28, as represented in FIG. 4. Accordingly, despite the original misalignment shown in FIG. 3 between the fibers 20 and 28, the adjustable two-segment coupler described herein is seen to be effective to achieve a precise optical registration and hence a high-efficiency coupling between the fibers.

Achievement of the desired registration may be monitored, for example, by launching an optical beam into the lefthand end of the fiber 20 (FIG. 4) and adjusting the segments 30 and 32 to obtain a maximum reading on a photodetector (not shown) coupled to the righthand end of the fiber 28.

The coupler shown in FIG. 4 is characterized by a displacement step-down ratio. In other words $\Delta x$ is greater than $\Delta s$. More specifically, the relationship between these distances may be expressed as follows:

$$\Delta x/\Delta s = 1/\sin(\pi \Delta L/L) \quad (2)$$

where $\Delta L$ is as specified above and shown in FIG. 3 and L is the overall length of the segments 30 and 32.

In an actual illustrative embodiment of the structure shown in FIGS. 3 and 4 wherein $\Delta L$ was 0.45 millimeters and L was 14.75 millimeters, the displacement step-down ratio was measured to be approximately 11:1.

In cases in which two optical fiber ends are to be coupled together, it may be advantageous to form a shallow cylindrical guide hole (not shown in FIGS. 3 and 4) in each of the end faces of the herein-considered two-segment coupler. Such holes, formed, for example, by laser drilling and approximately respectively centered with respect to the optic axes of the segments 30 and 32, would be slightly oversize with respect to the outer diameter of the fibers to be spliced. Although such guide holes serve to facilitate the gross alignment of the fibers, a fine adjustment on the relative positions thereof is still as a practical matter usually required to achieve optimal coupling. This fine adjustment is carried out by moving the segments 30 and 32 with respect to each other as described above.

The beam that emerges from the righthand face of the segment 32 of FIG. 4 is slightly canted relative to the axis 40. Accordingly, the emerging beam does not enter the core 34 of the output fiber 28 exactly along or parallel to the longitudinal axis of the fiber 28. Nevertheless, the optical power that is actually delivered to the fiber 28 is considerably higher than what is achieved as a practical matter when the depicted fiber ends are simply butted together.

Figure 5:
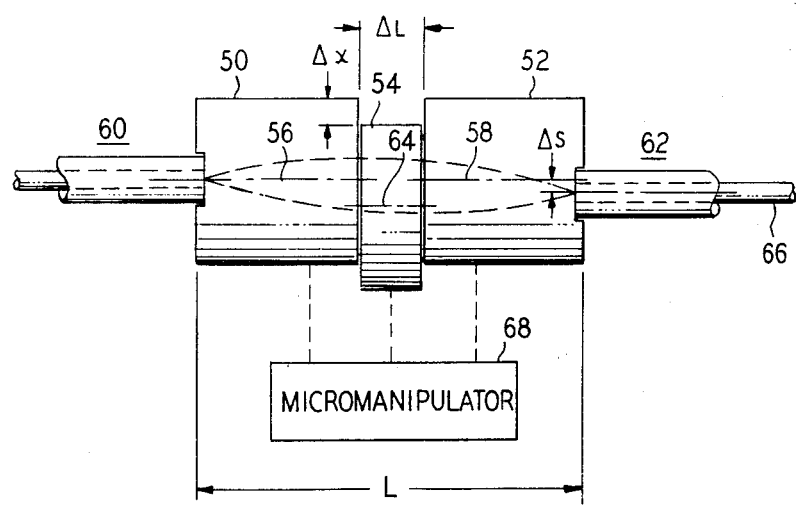
FIG. 5 represents a three-segment coupler made in accordance with this invention.

FIG. 5 shows another specific illustrative coupler made in accordance with the principles of the present invention. The depicted structure includes two stationary graded-index segments 50 and 52 having a movable graded-index segment 54 positioned therebetween. For illustrative purposes guide holes of the type mentioned above are shown in the respective end faces of the three-segment coupler. The overall longitudinal length of the three segments 50, 52 and 54 measured between the bottoms of the two guide holes is a half wavelength of the period of the sinusoidal path followed by an optical beam in propagating through the coupler.

In FIG. 5 the lefthand guide hole is shown as having been formed precisely centered on the optic axis 56 of the segment 50, but the righthand guide hole is shown as having been formed slightly off-center with respect to the optic axis 58 of the segment 52. Even if the righthand guide hole were exactly centered relative to the axis 58, lateral deviation of fibers 60 and 62 in their respective holes during assembly of the depicted structure would most likely result in less-than-perfect axial alignment between the fibers. In any case (and assuming that the optic axis 64 of the segment 54 were colinear with the axes 56 and 58) an input beam provided by the fiber 60 would most likely not be imaged directly on the core 66 of the output fiber 62.

In accordance with the present invention x–y movement of the segment 54 of FIG. 5 causes the image spot of an applied beam to move with respect to a fixed point on the righthand face of the segment 52. Such movement, accomplished, for example, by a conventional micromanipulator 68 temporarily attached to the segments 50 52 and 54, is effective to achieve a precise registration of the image spot relative to the core 66, as indicated in FIG. 5. As a result a high-efficiency coupling between the fibers 60 and 62 is realized.

Movement of the segment 54 of FIG. 5 in, for example, the x direction by an amount $\Delta x$ causes the image spot to move in the same direction by a lesser amount $\Delta s$. The displacement step-down ratio of the FIG. 5 embodiment may also be expressed by equation (2), given above, where $\Delta L$ is now understood to represent the length of the segment 54, as illustrated in FIG. 5. Accordingly, it is evident that as the thickness $\Delta L$ of the movable segment 54 decreases, the indicated ratio $\Delta x/\Delta s$ increases.

The beam that emerges from the righthand face of the three-segment coupler illustrated in FIG. 5 is also slightly canted. But in comparison to a two-segment coupler of the type shown in FIGS. 3 and 4 having the same displacement step-down ratio, the depicted three-segment structure provides an output beam whose deviation from perpendicularity is relatively small. The smaller $\Delta L/L$ becomes, the smaller becomes this deviation from perpendicularity.

The two segments 50 and 52 of FIG. 5 need not be equal in length. However, if they are the same length, the deviation from perpendicularity of the output beam is minimized. Hence, for illustrative purposes, the segments 50 and 52 are shown in FIG. 5 as being identical equal-length members.

Typically, the segments 50 and 52 of FIG. 5 remain stationary during adjustment of the illustrated three-segment structure to optimize coupling between the fibers 60 and 62. Hence, the chances of straining the fibers or causing movement thereof relative to the segments 50 and 52 during adjustment are minimized.

Advantageously, suitable index-matching materials are interposed between the fiber ends and the respective bottoms of the guide holes shown in FIG. 5. Typically, these materials themselves or other materials are utilized to mechanically adhere the fibers to their respective segments. In addition, an index-matching material is advantageously placed between the movable segment 54 and the adjacent segments 50 and 52. Illustratively, this material may also be a hardenable adhesive so that after adjustment of the coupler the material is effective (for example, as a result of having heat applied thereto) to mechanically maintain the structure in its adjusted condition.

Although emphasis herein has been directed to the use of a plural-segment coupler for connecting together two optical fibers in a precise high-efficiency manner, it is evident that such a coupler is useful in a number of other applications. Thus, for example, the described coupler may be used as an adjustable optical probe for examining cellular structures. Or the coupler may be included in an optical beam memory addressing system for achieving an initial predetermined registration between the beam and the memory cells to be addressed. In such applications, the specific three-segment embodiment shown in FIG. 5 is additionally advantageous because, as indicated above, the segment 50 can remain stationary with respect to the light source on its input face, and the segment 52 can remain stationary with respect to the object being probed or addressed. Accordingly, the object can then advantageously be brought into physical contact with the segment 52 without the risk of damaging the object which might be present if it were necessary to move the segment 52 laterally with respect to the object.

Finally, it is to be understood that the above-described arrangements are only illustrative of the application of the principles of the present invention. In accordance with these principles numerous other related arrangements may be devised by those skilled in the art without departing from the spirit and scope of the invention.

What is claimed is:

1. In combination, means including at least one graded-index-of-refraction cylindrical segment for propagating an input optical beam, said means having an overall longitudinal length $L_1$, and a movable graded-index-of-refraction cylindrical segment positioned in butting relationship with said means, said movable segment having a longitudinal length $L_2$, where $L_1$ is not equal to $L_2$ and $L_1$ plus $L_2$ is a half wavelength of the period of the sinusoidal path followed by said beam in propagating through said segments.

2. A combination as in claim 1 wherein said means includes a single graded-index cylindrical segment having a longitudinal length $L_1$.

3. A combination as in claim 1 wherein said means includes two graded-index cylindrical segments having an overall longitudinal length $L_1$ and wherein said movable segment is sandwiched between said two segments.

4. An optical coupler comprising a first graded-index-of-refraction cylindrical segment having a length $L_1$, and a second graded-index-of-refraction cylindrical segment having a length $L_2$ positioned in a longitudinally butting relationship with respect to said first segment, said segments being laterally movable with respect to each other, where $L_1$ is not equal to $L_2$ and $L_1$ plus $L_2$ approximates a half wavelength of the period of the sinusoidal path followed by an optical beam in propagating through said segments.

5. A coupler as in claim 4 further including means for applying an optical beam to one end face of said two-segment coupler and for abstracting said beam from the other end face thereof.

6. An optical coupler comprising first and second graded-index of refraction cylindrical segments, and a third graded-index of refraction cylindrical segment positioned between said first and second segments in butting movable relationship therewith, the overall longitudinal length of said first, second and third segments being a half wavelength of the period of the sinusoidal path followed by an optical beam in propagating through said segments.

7. A coupler as in claim 6 further including means for applying an optical beam to one end face of said three-segment coupler and for abstracting said beam from the other end face thereof.

* * * * *